(12) United States Patent
Crane et al.

(10) Patent No.: US 7,353,659 B2
(45) Date of Patent: Apr. 8, 2008

(54) SYSTEM AND METHOD FOR CONTROLLING AN ECONOMIZER CIRCUIT

(75) Inventors: Curtis Christian Crane, York, PA (US); Frank Highland Hill, IV, York, PA (US); Glenn Eugene Nickey, New Oxford, PA (US)

(73) Assignee: York International Corporation, York, PA (US)

( * ) Notice: Subject to any disclaimer, the term of this patent is extended or adjusted under 35 U.S.C. 154(b) by 474 days.

(21) Appl. No.: 11/140,635

(22) Filed: May 27, 2005

(65) Prior Publication Data

US 2005/0262859 A1 Dec. 1, 2005

Related U.S. Application Data

(60) Provisional application No. 60/575,627, filed on May 28, 2004.

(51) Int. Cl.
*F25B 41/00* (2006.01)
*F25B 49/00* (2006.01)

(52) U.S. Cl. .................. 62/196.4; 62/197; 62/218; 62/509

(58) Field of Classification Search ............... 62/196.4, 62/197, 218, 222, 509
See application file for complete search history.

(56) References Cited

U.S. PATENT DOCUMENTS 4,873,838 A 10/1989 Voorhis et al.
5,027,608 A 7/1991 Rentmeester et al.
5,077,983 A 1/1992 Dudley
5,174,123 A 12/1992 Erickson
5,477,695 A 12/1995 Sjoholm et al.
5,596,878 A 1/1997 Hanson et al.
5,634,350 A 6/1997 De Medio
5,806,327 A 9/1998 Lord et al.
5,907,957 A 6/1999 Lee et al.
6,176,095 B1 1/2001 Porter
6,202,438 B1 3/2001 Barito
6,213,731 B1 4/2001 Doepker et al.
6,474,087 B1 11/2002 Lifson
6,530,238 B2 3/2003 Hansen
6,601,397 B2 8/2003 Pham et al.
6,681,583 B2 1/2004 Taguchi
6,941,769 B1 * 9/2005 Hill et al. ............... 62/512
6,973,797 B2 * 12/2005 Nemit, Jr. ............... 62/196.1
2002/0066286 A1 6/2002 Alsenz
2003/0010046 A1 * 1/2003 Freund et al. ............ 62/222

FOREIGN PATENT DOCUMENTS

EP 0 529 883 A2 12/1992
EP 0 564 123 10/1993
JP 02 037259 2/1990

* cited by examiner

*Primary Examiner*—Marc Norman
(74) *Attorney, Agent, or Firm*—McNees Wallace & Nurick, LLC

(57) ABSTRACT

A control algorithm for controlling an economizer circuit in a chiller system is provided. The control algorithm opens and closes a port valve in the economizer circuit in response to predetermined criteria to engage and disengage the economizer circuit. The predetermined criteria can include an operating parameter of a compressor and a level of liquid refrigerant in a flash tank.

30 Claims, 5 Drawing Sheets

SYSTEM AND METHOD FOR CONTROLLING AN ECONOMIZER CIRCUIT

CROSS-REFERENCE TO RELATED APPLICATIONS

This application claims the benefit of U.S. Provisional Application No. 60/575,627 filed May 28, 2004.

BACKGROUND OF THE INVENTION

The present invention relates generally to controlling an economizer circuit in a chiller system. More specifically, the present invention relates to controlling the economizer circuit of a chiller system by controlling a valve for the economizer port of a compressor.

In refrigeration and chiller systems, a refrigerant gas is compressed by a compressor and then delivered to the condenser. The refrigerant vapor delivered to the condenser enters into a heat exchange relationship with a fluid, e.g., air or water, and undergoes a phase change to a refrigerant liquid. The liquid refrigerant from the condenser flows through a corresponding expansion device(s) to an evaporator. The liquid refrigerant in the evaporator enters into a heat exchange relationship with another fluid, e.g. air, water or other secondary liquid, and undergoes a phase change to a refrigerant vapor. The other fluid flowing through the evaporator is chilled or cooled as a result of the heat-exchange relationship with the liquid refrigerant and is then typically provided to an enclosed space to cool the enclosed space. Finally, the vapor refrigerant in the evaporator returns to the compressor to complete the cycle.

To provide increased capacity, efficiency and performance of the refrigeration or chiller system, an economizer circuit can be incorporated into the system. An economizer circuit can typically include an economizer heat exchanger or flash tank, an inlet line to the flash tank that is connected to the condenser or to the main refrigerant line downstream of the condenser, an economizer expansion device, which is incorporated in the inlet line, a first outlet line from the flash tank that is connected to the main refrigerant line upstream of the expansion device, and a second outlet line from the flash tank that is connected to a port within the compression chamber of the compressor or to the suction inlet of the compressor.

In flash tank economizer circuits, liquid refrigerant from the condenser flows through the inlet line and expansion device into the flash tank. Upon passing through the expansion device, the liquid refrigerant experiences a pressure drop, whereupon, at least a portion of the refrigerant rapidly expands or "flashes" and is converted from a liquid to a gas. The liquid refrigerant in the flash tank collects at the bottom of the flash tank and returns to the main refrigerant circuit through the first outlet line. The first outlet line may incorporate one or more valves to control the amount of liquid refrigerant returned to the main refrigerant circuit. The gaseous refrigerant in the flash tank collects at the top of the flash tank and returns to the compressor through the second outlet line to either the suction inlet or the compression chamber, usually to a point in the compression chamber at an intermediate pressure. The second outlet line may also incorporate one or more valves to control the amount of gaseous refrigerant provided to the compressor.

As discussed above, an economizer circuit can be used to provide increased capacity, efficiency and performance of the refrigeration or chiller system. For example, the economizer circuit can improve system efficiency by providing refrigerant gas at an intermediate pressure to the compressor, thereby reducing the amount of work required by the compressor and increasing compressor efficiency. A variety of parameters in the economizer circuit can be controlled to provide the increased capacity, efficiency and performance of the refrigeration or chiller system. In particular, the amounts of refrigerant entering and leaving the flash tank can be controlled, as well as the amount of liquid refrigerant in the tank, to obtain the desired capacity, efficiency and performance of the refrigeration or chiller system.

Therefore, what is needed is a system and method for simply and easily controlling an economizer circuit to provide improved performance to a refrigeration or chiller system.

SUMMARY OF THE INVENTION

One embodiment of the present invention is directed to a method for controlling an economizer circuit in a chiller system. The method includes the steps of providing an economizer circuit for a chiller system having a flash tank, an inlet line to the flash tank and an outlet line from the flash tank connected to an economizer port of a compressor of the chiller system. The outlet line includes a valve to control flow of refrigerant in the outlet line. The method also includes the steps of determining whether a level of liquid in the flash tank is less than a predetermined level and determining whether an operating parameter of the compressor is greater than a first predetermined value related to the operating parameter of the compressor. The method further includes the step of actuating the valve to engage the economizer circuit in response to a determination that the liquid level in the flash tank is less than the predetermined level and a determination that the operating parameter of the compressor is greater than the first predetermined value related to the operating parameter of the compressor.

Another embodiment of the present invention is directed to a chiller system includes a refrigerant circuit having a compressor, a condenser arrangement, an expansion valve and an evaporator arrangement connected in a closed refrigerant loop. The chiller system also includes an economizer circuit connected to the refrigerant circuit. The economizer circuit including a flash tank having a first outlet line in fluid communication with the expansion valve and a second outlet line in fluid communication with the compressor. The second outlet line includes a valve to control flow of refrigerant from the flash tank to the compressor. The chiller system further includes a control panel to control the valve to activate and deactivate the economizer circuit. The control panel is configured to open the valve in response to a liquid level in the flash tank being less than a predetermined level and an operating parameter of the compressor being greater than a first predetermined value related to the operating parameter of the compressor to activate the economizer circuit.

Still another embodiment of the present invention is directed to a method for controlling an economizer circuit in a chiller system. The method includes the step of providing an economizer circuit for a chiller system having a flash tank, an inlet line to the flash tank and an outlet line from the flash tank connected to an economizer port of a compressor of the chiller system. The outlet line including a valve to control flow of refrigerant in the outlet line. The method also includes the steps of determining whether an outdoor ambient temperature is less than a predetermined temperature, determining whether an operating time for the compressor is less than a predetermined time period and determining whether an operating parameter of the compressor is greater than a first predetermined value related to the operating parameter of the compressor. The method further includes the step of actuating the valve to engage the economizer circuit in response to a determination that the liquid level in the flash tank is less than the predetermined level and a determination that the outdoor ambient temperature is less than a predetermined temperature and a determination that the operating time for the compressor is less than a predetermined time period.

One advantage of the present invention is that the operation of the economizer circuit can be controlled by opening and closing a solenoid valve for the economizer port of the compressor.

Another advantage of the present invention is that both compressor and chiller performance can be enhanced by selectively operating the economizer circuit in response to predetermined conditions.

Still another advantage of the present invention is that refrigerant can be circulated faster in the chiller during a startup in low ambient temperature conditions.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
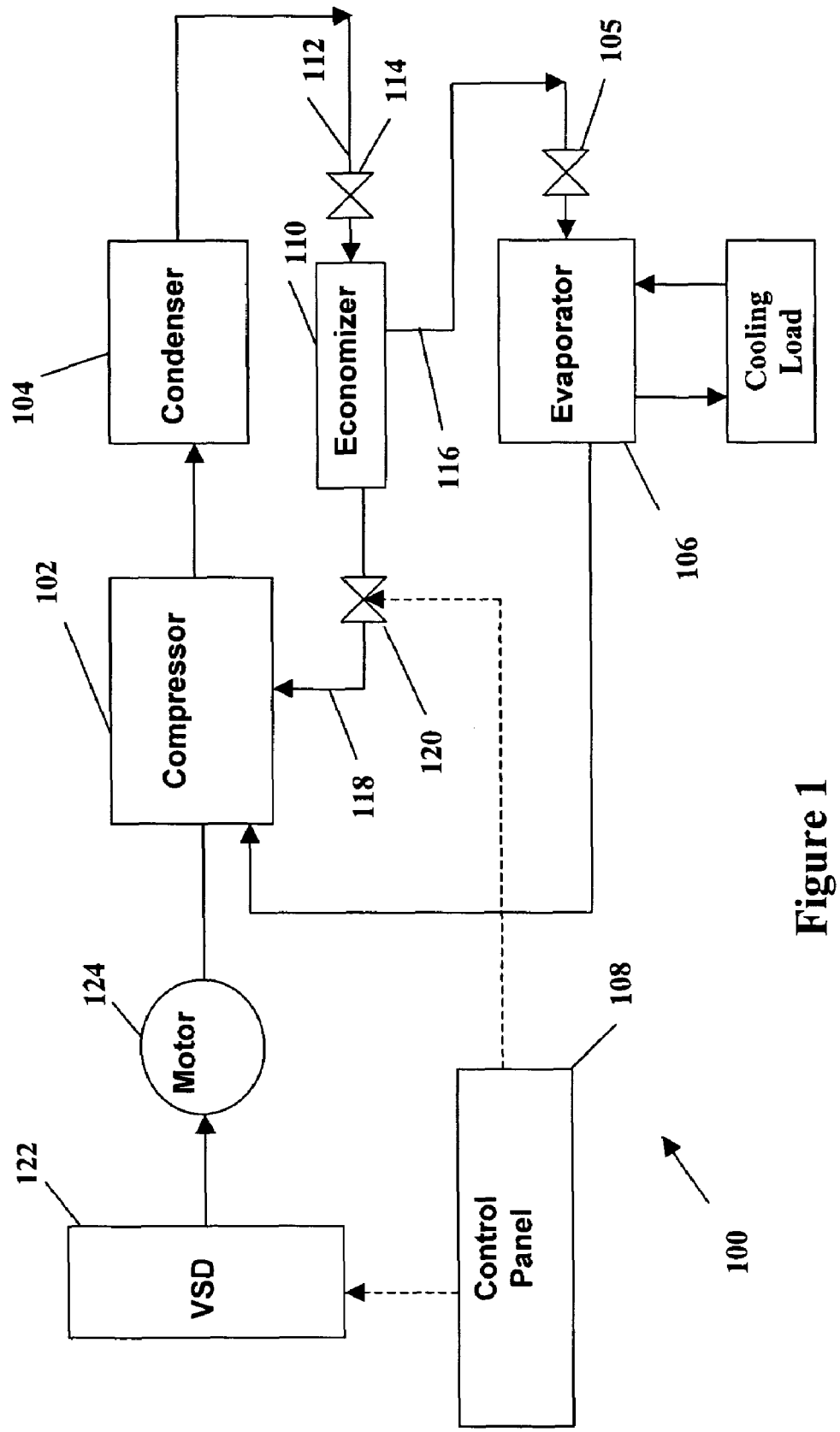
FIG. 1 illustrates an embodiment of a refrigeration or chiller system used with the present invention.

FIG. 1 illustrates generally an application that can be used with the present invention. As shown in FIG. 1, the HVAC, refrigeration or liquid chiller system 100 includes a compressor 102, a condenser arrangement 104, expansion device(s) 105, a liquid chiller or evaporator arrangement 106 and the control panel 108. The compressor 102 can be driven by a motor 124 that is powered by a variable speed drive (VSD) 122. In addition, the chiller system 100 has an economizer circuit that includes an economizer heat exchanger or flash tank 110, an inlet line 112, an economizer expansion valve 114, a first outlet line 116, a second outlet line 118 and a port valve 120.

The VSD 122 receives AC power having a particular fixed line voltage and fixed line frequency from an AC power source and provides AC power to the motor 124 at desired voltages and desired frequencies, both of which can be varied to satisfy particular requirements. Preferably, the VSD 122 can provide AC power to the motor 124 that may have higher voltages and frequencies and lower voltages and frequencies than the rated voltage and frequency of the motor 124. The motor 124 is preferably an induction motor that is capable of being operated at variable speeds. However, any suitable motor that can be operated at variable speeds can be used with the present invention.

Compressor 102, driven by motor 124, compresses a refrigerant vapor and delivers the vapor to the condenser 104 through a discharge line. The compressor 102 is preferably a screw compressor, but can be any suitable type of compressor, e.g., centrifugal compressor, reciprocating compressor, etc. The refrigerant vapor delivered by the compressor 102 to the condenser 104 enters into a heat exchange relationship with a fluid, e.g., air or water, and undergoes a phase change to a refrigerant liquid as a result of the heat exchange relationship with the fluid. The condensed liquid refrigerant from condenser 104 flows through an expansion device 105 to an evaporator 106.

The evaporator 106 can include connections for a supply line and a return line of a cooling load. A secondary liquid, e.g., water, ethylene, calcium chloride brine or sodium chloride brine, travels into the evaporator 106 via return line and exits the evaporator 106 via supply line. The liquid refrigerant in the evaporator 106 enters into a heat exchange relationship with the secondary liquid to lower the temperature of the secondary liquid. The refrigerant liquid in the evaporator 106 undergoes a phase change to a refrigerant vapor as a result of the heat exchange relationship with the secondary liquid. The vapor refrigerant in the evaporator 106 exits the evaporator 106 and returns to the compressor 102 by a suction line to complete the cycle. It is to be understood that any suitable configuration of condenser 104 and evaporator 106 can be used in the system 100, provided that the appropriate phase change of the refrigerant in the condenser 104 and evaporator 106 is obtained.

The economizer circuit is incorporated in the main refrigerant circuit between the condenser 104 and the expansion device 105. The economizer circuit has an inlet line 112 that is either connected directly to or is in fluid communication with the condenser 104. The inlet line 112 has an economizer expansion valve 114 upstream of the flash tank 110. The economizer expansion valve 114 operates to lower the pressure of the liquid refrigerant from the condenser 104 flowing through the economizer expansion valve 114. Downstream of the economizer expansion valve 114, both liquid refrigerant and gaseous refrigerant enters the flash tank 110. Inside the flash tank 110, gaseous refrigerant preferably collects in the top or upper portion of the flash tank 110 and the liquid refrigerant preferably settles in the bottom or lower portion of the flash tank 110.

The liquid refrigerant in the flash tank 110 then flows or travels through the first outlet line 116 to the expansion valve 105. The second outlet line 118 preferably returns the gaseous refrigerant in the flash tank 110 to an economizer port in the compressor 102 connected directly to a compression chamber of the compressor 102. Alternatively, second outlet line 118 can return the gaseous refrigerant in the flash tank 110 to the suction inlet of the compressor 102. The second outlet line 118 includes at least one economizer port valve 120 to control the flow of gaseous refrigerant from the flash tank 110 to the compressor 102. The economizer port valve 120 is preferably a solenoid valve, however any suitable type of valve can be used including valve that can be variably adjusted and incrementally adjusted (stepped) between an open position and a closed position. In another embodiment of the present invention, the economizer circuit can operate in a similar manner to that discussed above, except that instead of receiving all of the refrigerant from the condenser 104, as shown in FIG. 1, the economizer circuit receives only a portion of the refrigerant from the condenser 104 and the remaining refrigerant proceeds directly to the expansion device 105.

A conventional HVAC, refrigeration or liquid chiller system 100 with an economizer circuit includes many other features that are not shown in FIG. 1. These features have been purposely omitted to simplify the drawing for ease of illustration. Furthermore, while FIG. 1 illustrates the HVAC, refrigeration or liquid chiller system 100 as having one compressor connected in a single refrigerant circuit, it is to be understood that the system 100 can have multiple compressors connected into each of one or more refrigerant circuits. In addition, each refrigerant circuit can have its own economizer circuit(s) as described above.

The control panel 108 can include an analog to digital (A/D) converter, a microprocessor, a non-volatile memory, and an interface board to control operation of the refrigeration system 100. The control panel 108 can also be used to control the operation of the VSD 122, the motor 124 and the compressor 102. The control panel 108 executes a control algorithm(s) or software to control operation of the system 100 and to determine and implement an operating configuration for the economizer port valve 120 to engage and disengage the economizer circuit. In one embodiment, the control algorithm(s) can be computer programs or software stored in the non-volatile memory of the control panel 108 and can include a series of instructions executable by the microprocessor of the control panel 108. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 108 can be changed to incorporate the necessary components and to remove any components that may no longer be required.

FIGS. 2-5 illustrate embodiments of the economizer port valve control process of the present invention. The valve control process can be initiated in response to a starting command or instruction from a capacity control process or other control program for the chiller system. The economizer port valve control process can be a stand-alone process or program or it can be incorporated into a larger control process or program, such as a capacity control program for the chiller system.

Figure 2:
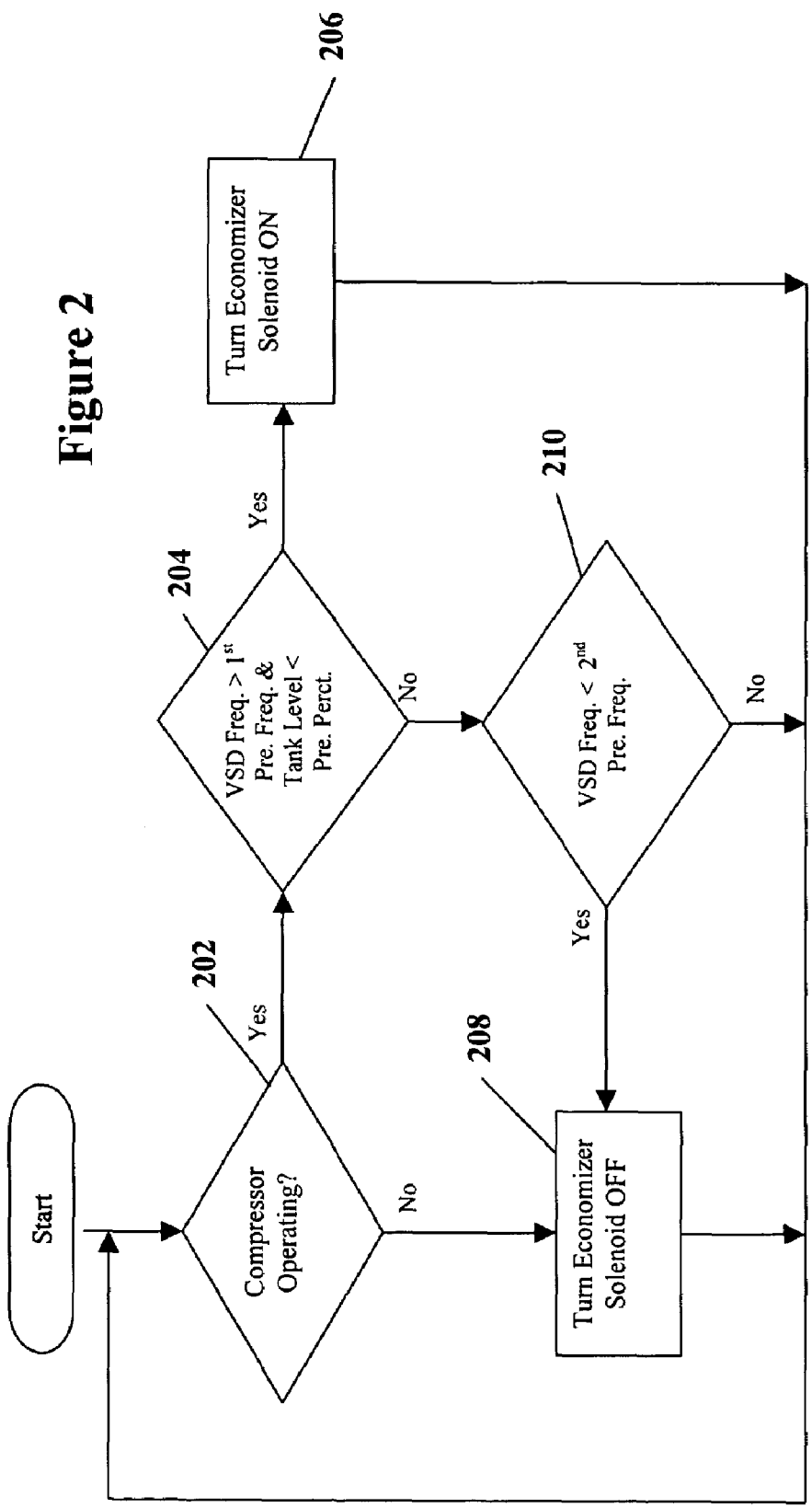
FIG. 2 is a flowchart showing an embodiment of the economizer port valve control process of the present invention.

The process in FIG. 2 begins by determining if the compressor 102 is in operation in step 202. If the compressor 102 is not operating in step 202, then the economizer port valve 120 is turned "off" or closed in step 208 to disengage the economizer circuit. The control process then returns to step 202. However, if the compressor 102 is in operation in step 202, then it is determined in step 204 if the VSD 122 is providing an output frequency to the motor 124 and compressor 102 greater than a first predetermined frequency and it is determined if the level of liquid refrigerant in the flash tank 120 is less than a predetermined flash tank liquid level percentage. The first predetermined frequency can be between about 50 Hz and about 200 Hz and is preferably about 120 Hz. The predetermined flash tank liquid level percentage is a value that is determined based on the particular technique or device that is used to measure the liquid level in the flash tank. This means that the same level of liquid in the flash tank can have different predetermined flash tank liquid level percentages depending on the particular devices or techniques that are being used to measure the level of liquid in the flash tank.

In a preferred embodiment of the present invention, the level of liquid in the flash tank can be measured using a capacitance probe and the predetermined flash tank liquid level percentage corresponds to an amount of liquid covering the probe or rod. For example, a predetermined flash tank liquid level percentage of 50% would correspond to 50% of the probe or rod being covered or submersed in liquid. In addition, depending on the configuration of the probe, there can be multiple liquid levels in the flash tank that correspond to 0% (no part of the probe is covered) and 100% (the entire probe is covered). In this embodiment, the predetermined flash tank liquid level percentage can be between about 0% and about 100% and is preferably between about 15% and about 85% and is most preferably about 75%.

If the VSD output frequency is greater than the first predetermined frequency and the level of liquid refrigerant in the flash tank 110 is less than the predetermined flash tank liquid level percentage, then the economizer port valve 120 is turned "on" or opened in step 206 to engage the economizer circuit and the control process returns to step 202. A positive evaluation in step 204 indicates that the conditions in the system 100 are appropriate for the engaging of the economizer circuit to increase the performance of the system 100. In particular, the system 100 is operating at an appropriate compressor speed and the flash tank 110 has a liquid level that should not permit liquid refrigerant to be drawn into the compressor 102 during operation of the economizer circuit. If the VSD output frequency is not greater than the first predetermined frequency or the level of liquid refrigerant in the flash tank 120 is not less than the predetermined flash tank liquid level percentage, then the control process goes to step 210 to determine if the VSD output frequency is less than a second predetermined frequency. The second predetermined frequency can be between about 50 Hz and about 200 Hz and is preferably about 100 Hz. In response to the VSD output frequency being less than the second predetermined frequency, the control process goes to step 208 to turn the economizer port valve "off" and the control process returns to step 202. A positive evaluation in step 210 indicates that the conditions in the system 100 are no longer appropriate for the economizer circuit to provide increased system performance. If the VSD output frequency is greater than the second predetermined frequency, the control process returns to step 202 and does not change the configuration of the economizer port valve 120.

Figure 3:
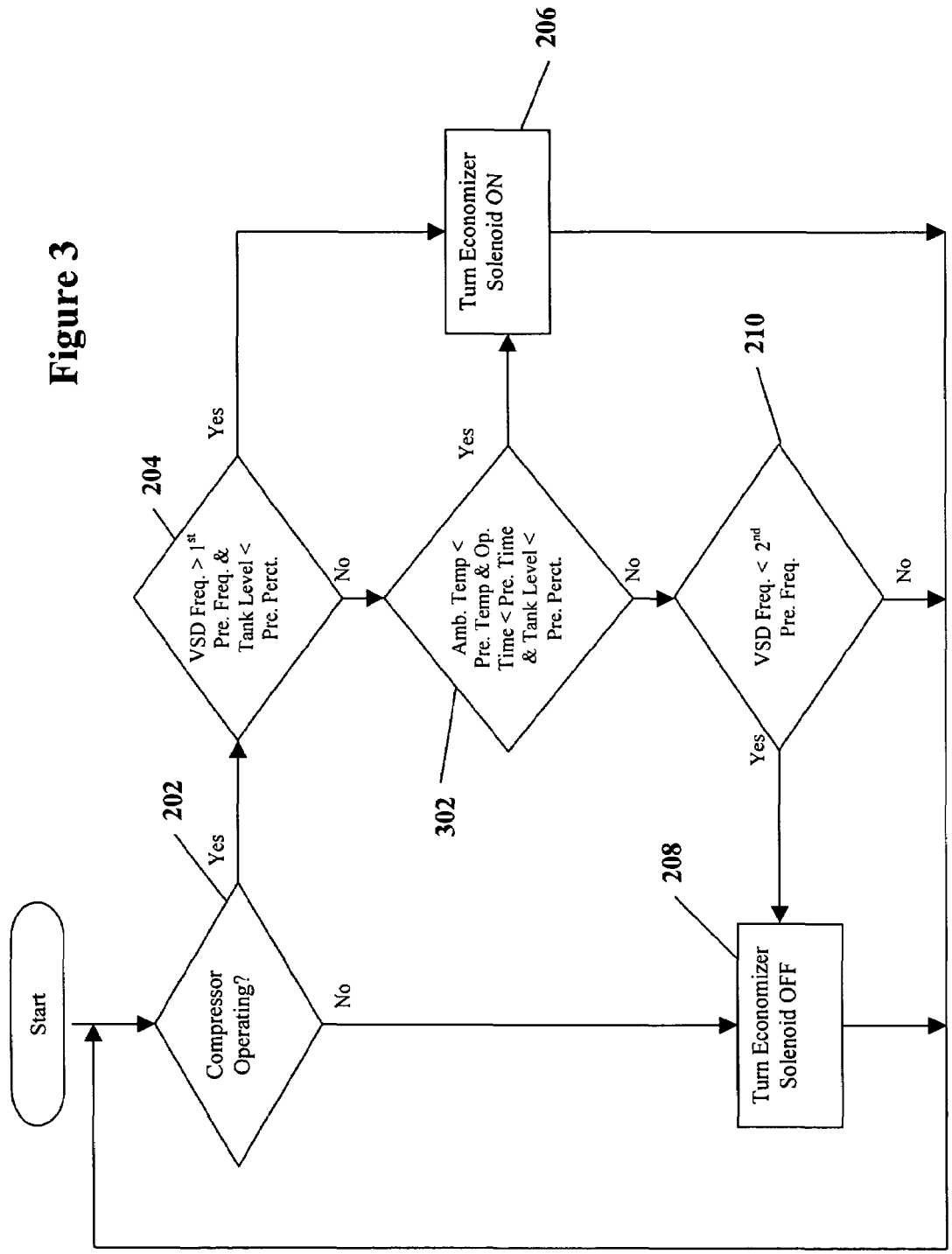
FIG. 3 is a flowchart showing another embodiment of the economizer port valve control process of the present invention.

FIG. 3 illustrates another embodiment of the economizer port valve control process of the present invention. The valve control process of FIG. 3 is similar to the valve control process of FIG. 2 and to simplify the description of the control process only the differences between the control processes of FIG. 2 and FIG. 3 are described. The control process of FIG. 3 differs from the control process of FIG. 2 in that an additional step is provided between step 204 and step 210. In response to a negative evaluation in step 204, the additional step, step 302, determines if the outdoor ambient temperature is less than a predetermined temperature, the operating time of the compressor is less than a predetermined time period and the level of liquid refrigerant in the flash tank 120 is less than the predetermined flash tank liquid level percentage. The predetermined temperature can be between about 20° F. and about 70° F. and is preferably about 40° F. The predetermined time period can be between about 1 minute and about 10 minutes and is preferably about 5 minutes.

If the outdoor ambient temperature is less than the predetermined temperature, the operating time of the compressor is less than the predetermined time period and the level of liquid refrigerant in the flash tank 120 is less than the predetermined flash tank liquid level percentage, then the economizer port valve 120 is turned "on" or opened in step 206 to engage the economizer circuit and the control process returns to step 202. The economizer circuit is engaged in response to satisfying the criteria in step 302 in order to provide improved performance for system start-up at low ambient temperature conditions. The improved performance at low ambient temperatures is provided by increasing the refrigerant flow rate through the system 100 by using the economizer circuit to get the system pressures to the "steady state" system pressures and to avoid possible system shutdowns for low pressure or oil pressure faults. If all three criteria are not satisfied in step 302, then control goes to step 210 as described in detail above with respect to FIG. 2.

Figure 4:
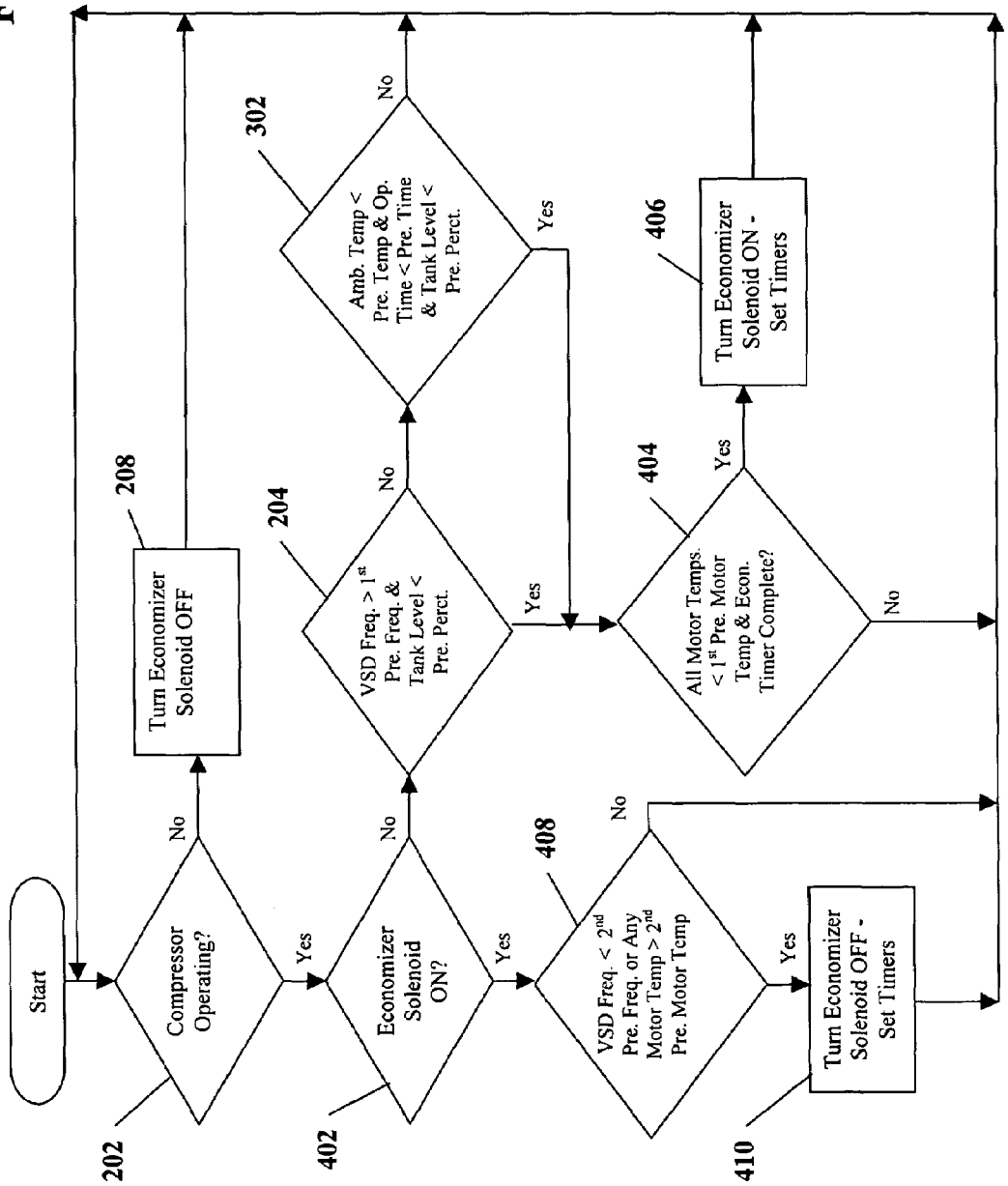
FIG. 4 is a flowchart showing still another embodiment of the economizer port valve control process of the present invention.

FIG. 4 illustrates a further embodiment of the economizer port valve control process of the present invention. The valve control process of FIG. 4 includes similar steps as in the valve control processes of FIGS. 2 and 3. The process in FIG. 4 begins by determining if the compressor 102 is in operation in step 202. If the compressor 102 is not operating in step 202, then the economizer port valve 120 is turned "off" or closed in step 208 to disengage the economizer circuit. The control process then returns to step 202. However, if the compressor 102 is in operation in step 202, then it is determined in step 402 if the economizer port valve 120 is "on" or opened.

If the economizer port valve 120 is "off" or closed in step 402, then the control process goes to step 204 to determine if the VSD 122 is providing an output frequency to the motor 124 and compressor 102 greater than a first predetermined frequency and to determine if the level of liquid refrigerant in the flash tank 120 is less than a predetermined flash tank liquid level percentage. The first predetermined frequency can be between about 50 Hz and about 200 Hz and is preferably about 120 Hz. The predetermined flash tank liquid level is determined as discussed in detail above and is preferably about 75%.

In response to a negative evaluation in step 204, a determination is made in step 302 as to whether the outdoor ambient temperature is less than a predetermined temperature, the operating time of the compressor is less than a predetermined time period and the level of liquid refrigerant in the flash tank 120 is less than the predetermined flash tank liquid level percentage. The predetermined temperature can be between about 20° F. and about 70° F. and is preferably about 40° F. The predetermined time period can be between about 1 minute and about 10 minutes and is preferably about 5 minutes. If all three criteria are not satisfied in step 302, then control goes to step 202 to and does not change the configuration of the economizer port valve 120.

If the outdoor ambient temperature is less than the predetermined temperature, the operating time of the compressor is less than the predetermined time period and the level of liquid refrigerant in the flash tank 110 is less than the predetermined flash tank liquid level percentage in step 302 or if the VSD output frequency is greater than the first predetermined frequency and the level of liquid refrigerant in the flash tank 110 is less than the predetermined flash tank liquid level percentage in step 204, then the control process goes to step 404. In step 404 it is determined if the temperature of the motor 124 is less than a first predetermined motor temperature or, if more than one refrigerant circuit with an economizer circuit is being used, the temperature of each of the motors 124 is less than the first predetermined motor temperature. The first predetermined motor temperature can be between about 120° F. and about 200° F. and is preferably about 150° F. Step 404 also includes determining whether an economizer timer has finished. The checking of the motor temperature in step 404 is conducted to avoid a high motor temperature trip resulting from the operation of the economizer which can drastically raise the temperature of the motor 124. The checking of economizer timer in step 404 is conducted to avoid frequent cycling of the economizer circuit that can result in instability of the system. If the motor temperature(s) are greater than the first predetermined motor temperature or the economizer timer has not finished or completed, then control goes to step 202 and does not change the configuration of the economizer port valve 120.

If the motor temperature(s) are less than the first predetermined motor temperature and the economizer timer has finished in step 404, then the economizer port valve 120 is turned "on" or opened in step 406 to engage the economizer circuit and to set a load timer and an economizer timer. If more than one refrigerant circuit with an economizer circuit is being used, all of the economizer timers are set in step 406. The load timer is provided as an input to the capacity control algorithm and can be set for about 10 seconds to about 90 seconds and is preferably set for 30 seconds. The economizer timer(s) can be set for about 10 seconds to about 90 seconds and is preferably set for 30 seconds, if the economizer timer is not already at a time greater than the time to be set in step 406. The control process then returns to step 202. The setting of all economizer timers in step 406 can also prevent more than one economizer from turning "on" at a time, thereby permitting the system capacity control algorithm to react to the system changes from engaging the economizer circuit.

Referring back to step 402, if the economizer port valve 120 is "on" or opened in step 402, then the control process goes to step 408 to determine if the VSD output frequency is less than a second predetermined frequency and to determine if the temperature of the motor 124 is greater than a second predetermined motor temperature or, if more than one refrigerant circuit with an economizer circuit is being used, the temperature of any of the motors 124 is greater than the second predetermined motor temperature. The second predetermined frequency can be between about 50 Hz and about 200 Hz and is preferably about 100 Hz. The second predetermined motor temperature can be between about 200° F. and about 300° F. and is preferably about 240° F. In response to the VSD output frequency being less than the second predetermined frequency and the motor(s) temperature being greater than the second predetermined motor temperature, the control process goes to step 410 to turn the economizer port valve "off" and to set an unload timer and an economizer timer. The unload timer is provided as an input to the capacity control algorithm and can be set for about 10 seconds to about 90 seconds and is preferably set for 30 seconds. The economizer time can be set for about 100 seconds to about 500 seconds and is preferably set for 300 seconds. The control process then returns to step 202.

Figure 5:
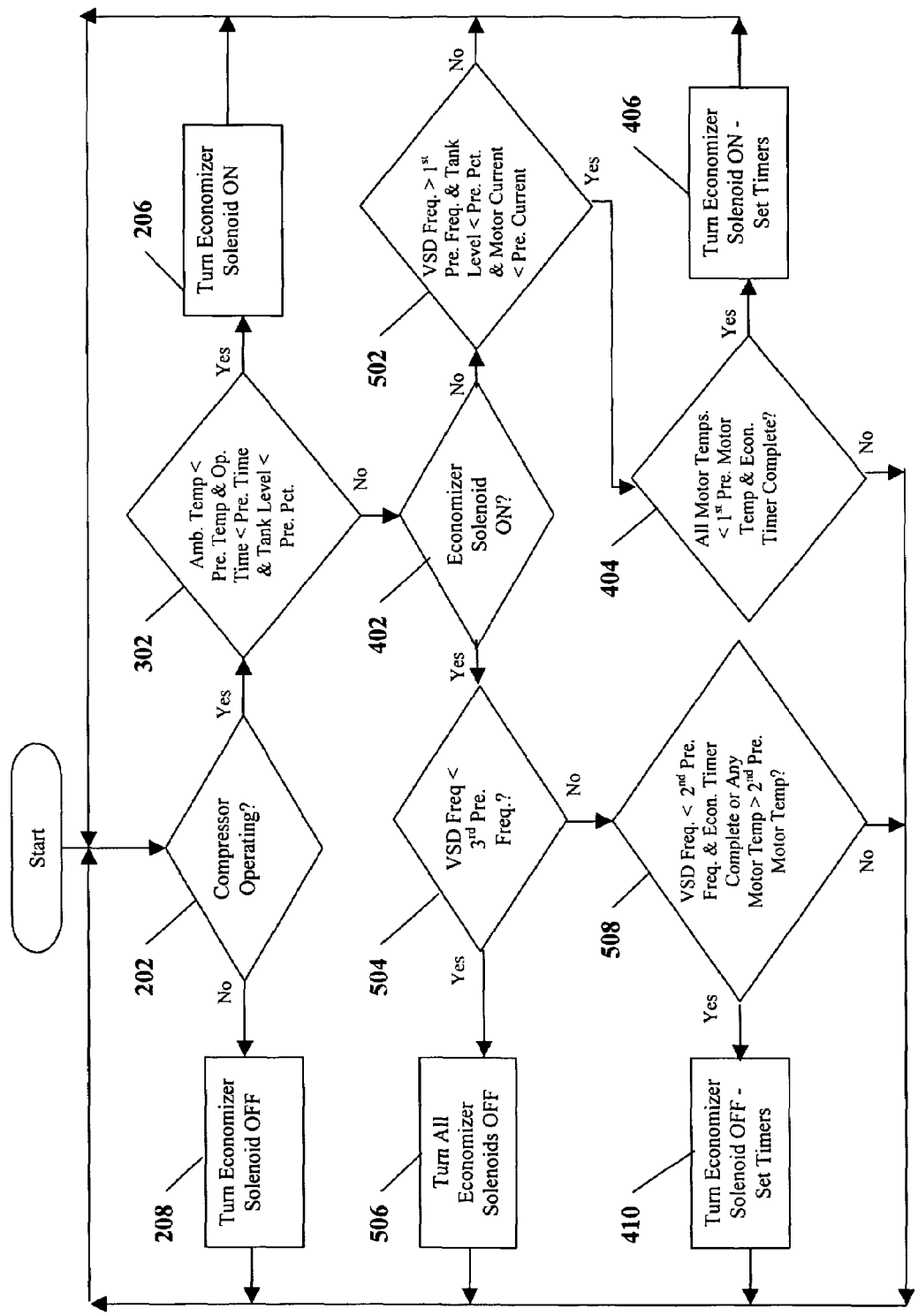
FIG. 5 is a flowchart showing a further embodiment of the economizer port valve control process of the present invention.

FIG. 5 illustrates an additional embodiment of the economizer port valve control process of the present invention. The valve control process of FIG. 5 includes similar steps as in the valve control processes of FIGS. 2-4. The process in FIG. 5 begins by determining if the compressor 102 is in operation in step 202. If the compressor 102 is not operating in step 202, then the economizer port valve 120 is turned "off" or closed in step 208 to disengage the economizer circuit and the economizer timer is set to zero. The control process then returns to step 202. However, if the compressor 102 is in operation in step 202, then the control process proceeds to step 302.

In step 302, a determination is made as to whether the outdoor ambient temperature is less than a predetermined temperature, the operating time of the compressor is less than a predetermined time period and the level of liquid refrigerant in the flash tank 120 is less than the predetermined flash tank liquid level percentage. The predetermined temperature can be between about 20° F. and about 70° F. and is preferably about 40° F. The predetermined time period can be between about 1 minute and about 10 minutes and is preferably about 5 minutes. If all three criteria are satisfied in step 302, the control then goes to step 206 to turn "on" or open the economizer port valve 120 thereby engaging the economizer circuit and the control process returns to step 202.

If the outdoor ambient temperature is not less than the predetermined temperature or the operating time of the compressor is not less than the predetermined time period or the level of liquid refrigerant in the flash tank 110 is not less than the predetermined flash tank liquid level percentage in step 302, then it is determined in step 402 if the economizer port valve 120 is "on" or opened. If the economizer port valve 120 is "off" or closed in step 402, then the control process goes to step 502 to determine if the VSD 122 is providing an output frequency to the motor 124 and compressor 102 greater than a first predetermined frequency, if the level of liquid refrigerant in the flash tank 120 is less than a predetermined flash tank liquid level percentage, and if the motor current is less than a predetermined motor current. The first predetermined frequency can be between about 50 Hz and about 200 Hz and is preferably about 120 Hz. The predetermined flash tank liquid level is determined as discussed in detail above and is preferably about 75%. The predetermined motor current can be between about 50% and about 95% of the full load motor current for the motor 124 and is preferably about 80% of the full load motor current.

In response to a negative evaluation in step 502, control process returns to step 202 and does not change the configuration of the economizer port valve 120. Otherwise, the control proceeds to step 404. In step 404 it is determined if the temperature of the motor 124 is less than a first predetermined motor temperature or, if more than one refrigerant circuit with an economizer circuit is being used, the temperature of each of the motors 124 is less than the first predetermined motor temperature. The first predetermined motor temperature can be between about 120° F. and about 200° F. and is preferably about 150° F. Step 404 also includes determining whether an economizer timer has finished. The checking of the motor temperature in step 404 is conducted to avoid a high motor temperature trip resulting from the operation of the economizer, which can drastically raise the temperature of the motor 124. The checking of economizer timer in step 404 is conducted to avoid frequent cycling of the economizer circuit that can result in instability of the system. If the motor temperature(s) are greater than the first predetermined motor temperature or the economizer timer has not finished or completed, then control goes to step 202 and does not change the configuration of the economizer port valve 120.

If the motor temperature(s) are less than the first predetermined motor temperature and the economizer timer has finished in step 404, then the economizer port valve 120 is turned "on" or opened in step 406 to engage the economizer circuit and to set a load timer and an economizer timer. If more than one refrigerant circuit with an economizer circuit is being used, then step 406 sets all of the economizer timers. The load timer is provided as an input to the capacity control algorithm and can be set for about 10 seconds to about 90 seconds and is preferably set for 35 seconds. The economizer timer(s) can be set for about 10 seconds to about 90 seconds and is preferably set for 30 seconds, if the economizer timer(s) is not already at a time greater than the time to be set in step 406. The control process then returns to step 202. The setting of all economizer timers in step 406 can also prevent more than one economizer from turning "on" at a time, thereby permitting the system capacity control algorithm to react to the system changes from engaging the economizer circuit.

Referring back to step 402, if the economizer port valve 120 is "on" or opened in step 402, then the control process goes to step 504 to determine if the VSD 122 is providing an output frequency to the motor 124 and compressor 102 that is less than a third predetermined frequency. The third predetermined frequency can be between about 50 Hz and about 100 Hz and is preferably about 90 Hz. In response to a positive evaluation in step 504, the economizer solenoid is tuned off in step 506 and the economizer timer is set to zero, or if more than one refrigerant circuit with an economizer circuit is being used, then all of the economizer solenoids are turned off and the corresponding economizer timers are set to zero.

If the output frequency to the motor 124 is not less than the third predetermined frequency in step 504, the control process proceeds to step 508 to determine if the VSD output frequency is less than a second predetermined frequency, if the economizer timer has completed, and if the temperature of the motor 124 is greater than a second predetermined motor temperature or, if more than one refrigerant circuit with an economizer circuit is being used, the temperature of any of the motors 124 is greater than the second predetermined motor temperature. The second predetermined frequency can be between about 50 Hz and about 200 Hz and is preferably about 100 Hz. The second predetermined motor temperature can be between about 200° F. and about 300° F. and is preferably about 240° F.

In response to the VSD output frequency being less than the second predetermined frequency and the economizer timer having completed, or the motor(s) temperature being greater than the second predetermined motor temperature, the control process goes to step 410 to turn the economizer port valve "off" and to set an unload timer and an economizer timer. If more than one refrigerant circuit with an economizer circuit is being used, then step 410 sets all of the economizer timers. The unload timer is provided as an input to the capacity control algorithm and can be set for about 10 seconds to about 90 seconds and is preferably set for 30 seconds. The economizer timer can be set for about 20 seconds to about 300 seconds and is preferably set for 60 seconds. The other economizer timers can be set for about 10 seconds to about 90 seconds and are preferably set for 30 seconds, if the economizer timers are not already at a time greater than the time to be set in step 410. The control process then returns to step 202. However, if the VSD output frequency is greater than the second predetermined frequency or the economizer timer has not completed, or the motor(s) temperature is less than the second predetermined motor temperature, the control process control goes to step 202 and does not change the configuration of the economizer port valve 120.

In another embodiment of the present invention, the economizer circuit can be engaged and disengaged in response to predetermined compressor loading or capacity thresholds, e.g., a slide valve position, instead of the VSD output frequency thresholds described above. Furthermore, additional predetermined criteria can be incorporated into the economizer port valve control processes and would provide additional opportunities to control the engaging and disengaging of the economizer circuit. The satisfaction of the additional predetermined criteria can result in further refinements as to when to engage and disengage the economizer circuit.

In one embodiment of the present invention, one or more of the first predetermined frequency, the predetermined flash tank liquid level percentage, the second predetermined frequency, the predetermined temperature, the first predetermined motor temperature, the second predetermined motor temperature and the predetermined time period can be set or adjusted by a user to a desired value. In another embodiment of the present invention, the first predetermined frequency, the predetermined flash tank liquid level percentage, the second predetermined frequency, the predetermined temperature, the first predetermined motor temperature, the second predetermined motor temperature and the predetermined time period are preset and cannot be changed or adjusted by the user.

In still another embodiment of the present invention having more than one refrigerant circuit with an economizer circuit being used, all of the corresponding economizer solenoids can be turned off in response to any of the compressors in any of the refrigerant circuits changing states. For example, the compressor switching from the off state to the on state would trigger the closing of all of the economizer solenoids to possibly avoid damage to the VSD or the other motors. In addition, the economizer solenoids can also be incrementally or variably opened or closed over several iterations of the control process to provide a smoother control operation and a greater level of control over the operation of the system 100.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling an economizer circuit in a chiller system, the method comprising the steps of:
    providing an economizer circuit for a chiller system having a flash tank, an inlet line to the flash tank and an outlet line from the flash tank connected to an economizer port of a compressor of the chiller system, the outlet line including a valve to control flow of refrigerant in the outlet line;
    determining whether a level of liquid in the flash tank is less than a predetermined level;
    determining whether an operating parameter of the compressor is greater than a first predetermined value related to the operating parameter of the compressor; and
    actuating the valve to engage the economizer circuit in response to a determination that the liquid level in the flash tank is less than the predetermined level and a determination that the operating parameter of the compressor is greater than the first predetermined value related to the operating parameter of the compressor.

2. The method of claim 1 further comprising the steps of:
    determining whether an operating parameter of the compressor is less than a second predetermined value related to the operating parameter of the compressor; and
    actuating the valve to disengage the economizer circuit in response to a determination that the operating parameter of the compressor is less than the second predetermined value related to the operating parameter of the compressor.

3. The method of claim 2 wherein the step of determining whether an operating parameter of the compressor is less than a second predetermined value related to the operating parameter of the compressor is executed in response to a determination that the liquid level in the flash tank is greater than the predetermined level or a determination that the operating parameter of the compressor is less than the first predetermined value related to the operating parameter of the compressor.

4. The method of claim 2 wherein the first predetermined value is a first predetermined output frequency from a variable speed drive and the second predetermined value is a second predetermined output frequency from a variable speed drive.

5. The method of claim 4 wherein the first predetermined output frequency is 120 Hz and the second predetermined output frequency is 100 Hz.

6. The method of claim 1 further comprising the steps of:
    determining whether the compressor of the chiller system is operation; and
    actuating the valve to disengage the economizer circuit in response to a determination that the compressor is not in operation.

7. The method of claim 1 further comprising the steps of:
    determining whether an outdoor ambient temperature is less than a predetermined temperature;
    determining whether an operating time for the compressor is less than a predetermined time period; and
    actuating the valve to engage the economizer circuit in response to a determination that the liquid level in the flash tank is less than the predetermined level and a determination that the outdoor ambient temperature is less than a predetermined temperature and a determination that the operating time for the compressor is less than a predetermined time period.

8. The method of claim 7 wherein the predetermined time period is 5 minutes and the predetermined temperature is 40° F.

9. The method of claim 7 further comprising the step of determining whether the economizer circuit is engaged.

10. The method of claim 9 further comprising, in response to a determination that the economizer circuit is engaged, the steps of:
    determining whether an operating parameter of the compressor is less than a second predetermined value related to the operating parameter of the compressor;

determining whether a temperature of a motor for the compressor is greater than a predetermined temperature; and actuating the valve to disengage the economizer circuit in response to a determination that the operating parameter of the compressor is less than the second predetermined value related to the operating parameter of the compressor or a determination that the temperature of a motor for the compressor is greater than a predetermined temperature.

11. The method of claim 10 wherein the chiller system comprises a plurality of refrigerant circuits each having a corresponding compressor and economizer circuit and the step of determining whether a temperature of a motor for the compressor is greater than a predetermined temperature is repeated for each compressor of the plurality of refrigerant circuits.

12. The method of claim 9 wherein the steps of determining whether a level of liquid in the flash tank is less than a predetermined level and determining whether an operating parameter of the compressor is greater than a first predetermined value related to the operating parameter of the compressor are executed in response to a determination that the economizer circuit is not engaged.

13. The method of claim 12 further comprising the steps of:
determining whether a temperature of a motor for the compressor is less than a predetermined temperature;
determining whether a timer for the economizer circuit has completed; and
the step of actuating the valve to engage the economizer circuit in response to a determination that the liquid level in the flash tank is less than the predetermined level and a determination that the operating parameter of the compressor is greater than the first predetermined value related to the operating parameter of the compressor is executed in response to a determination that the temperature of a motor for the compressor is less than a predetermined temperature and a determination that the timer for the economizer circuit has completed.

14. The method of claim 12 wherein the steps of determining whether an outdoor ambient temperature is less than a predetermined temperature and determining whether an operating time for the compressor is less than a predetermined time period are executed in response to a determination that the operating parameter of the compressor is less than a first predetermined value related to the operating parameter of the compressor.

15. The method of claim 14 further comprising the steps of:
determining whether a temperature of a motor for the compressor is less than a predetermined temperature;
determining whether a timer for the economizer circuit has completed; and
the step of actuating the valve to engage the economizer circuit in response to a determination that the liquid level in the flash tank is less than the predetermined level and a determination that the outdoor ambient temperature is less than a predetermined temperature and a determination that the operating time for the compressor is less than a predetermined time period is executed in response to a determination that the temperature of a motor for the compressor is less than a predetermined temperature and a determination that the timer for the economizer circuit has completed.

16. A method for controlling an economizer circuit in a chiller system, the method comprising the steps of:

providing an economizer circuit for a chiller system having a flash tank, an inlet line to the flash tank and an outlet line from the flash tank connected to an economizer port of a compressor of the chiller system, the outlet line including a valve to control flow of refrigerant in the outlet line;
determining whether an outdoor ambient temperature is less than a predetermined temperature;
determining whether an operating time for the compressor is less than a predetermined time period;
determining whether a level of liquid in the flash tank is less than a predetermined level; and
actuating the valve to engage the economizer circuit in response to a determination that the liquid level in the flash tank is less than the predetermined level and a determination that the outdoor ambient temperature is less than a predetermined temperature and a determination that the operating time for the compressor is less than a predetermined time period.

17. The method of claim 16 further comprising the steps of:
determining whether an operating parameter of the compressor is greater than a first predetermined value related to the operating parameter of the compressor;
determining whether current in a motor for the compressor is less than a predetermined current value;
determining whether a temperature of the motor for the compressor is less than a predetermined temperature; and
actuating the valve to engage the economizer circuit in response to a determination that the liquid level in the flash tank is less than the predetermined level and a determination that the operating parameter of the compressor is greater than the first predetermined value related to the operating parameter of the compressor and a determination that a temperature of a motor for the compressor is less than a predetermined temperature and a determination that current in a motor for the compressor is less than a predetermined current value.

18. The method of claim 16 further comprising the step of determining whether the economizer circuit is engaged.

19. The method of claim 18 further comprising, in response to a determination that the economizer circuit is engaged, the steps of:
determining whether an operating parameter of the compressor is less than a second predetermined value related to the operating parameter of the compressor; and
actuating the valve to disengage the economizer circuit in response to a determination that the operating parameter of the compressor is less than the second predetermined value related to the operating parameter of the compressor.

20. The method of claim 19 further comprising, in response to a determination that the operating parameter of the compressor is greater than the second predetermined value related to the operating parameter of the compressor, the steps of:
determining whether an operating parameter of the compressor is less than a third predetermined value related to the operating parameter of the compressor;
determining whether a temperature of a motor for the compressor is greater than a predetermined temperature; and
actuating the valve to disengage the economizer circuit in response to a determination that the operating parameter of the compressor is less than the third predetermined value related to the operating parameter of the compressor or a determination that the temperature of a motor for the compressor is greater than a predetermined temperature.

21. The method of claim 20 wherein the chiller system comprises a plurality of refrigerant circuits each having a corresponding compressor and economizer circuit and the step of determining whether a temperature of a motor for the compressor is greater than a predetermined temperature is repeated for each compressor of the plurality of refrigerant circuits.

22. The method of claim 21 wherein the step of actuating the valve to disengage the economizer circuit in response to a determination that the operating parameter of the compressor is less than the second predetermined value related to the operating parameter of the compressor is repeated for each economizer circuit.

23. The method of claim 16 further comprising the steps of:
  determining whether the compressor of the chiller system is operation; and
  actuating the valve to disengage the economizer circuit in response to a determination that the compressor is not in operation.

24. A chiller system comprising:
  a refrigerant circuit comprising a compressor, a condenser arrangement, an expansion valve and an evaporator arrangement connected in a closed refrigerant loop;
  an economizer circuit connected to the refrigerant circuit, the economizer circuit comprising a flash tank having a first outlet line in fluid communication with the expansion valve and a second outlet line in fluid communication with the compressor, the second outlet line comprising a valve to control flow of refrigerant from the flash tank to the compressor; and
  a control panel to control the valve to activate and deactivate the economizer circuit, the control panel being configured to open the valve to activate the economizer circuit in response to a liquid level in the flash tank being less than a predetermined level and an operating parameter of the compressor being greater than a first predetermined value related to the operating parameter of the compressor.

25. The chiller system of claim 24 wherein the refrigerant circuit further comprises a variable speed drive and motor to drive the compressor and the operating parameter of the compressor being an output frequency of the variable speed drive.

26. The chiller system of claim 24 wherein the compressor is a screw compressor having a slide valve and the operating parameter of the compressor being a position of the slide valve in the screw compressor.

27. The chiller system of claim 24 wherein the valve is a solenoid valve.

28. The chiller system of claim 24 further comprising:
  at least one additional refrigerant circuit;
  at least one additional economizer circuit connected to the at least one additional refrigerant circuit, the at least one additional economizer circuit including at least one additional valve to control refrigerant flow from the at least one additional economizer circuit;
  each at least one additional valve in each at least one additional economizer circuit being controlled by the control panel to activate and deactivate the corresponding at least one additional economizer circuit; and
  wherein the control panel is configured to close the valve and each at least one additional valve to deactivate the economizer circuit and the at least one additional economizer circuit in response to an operating parameter of the compressor being less than a second predetermined value related to the operating parameter of the compressor.

29. The chiller system of claim 28 wherein the control panel is configured to close the valve to deactivate the economizer circuit in response to a temperature of a motor for the compressor of the refrigerant circuit or a temperature of a motor for the compressor of each of the at least one additional refrigerant circuit being greater than a predetermined temperature.

30. The chiller system of claim 24 wherein the control panel is configured to open the valve to activate the economizer circuit in response to a liquid level in the flash tank being less than a predetermined level, an outdoor ambient temperature being less than a predetermined temperature and an operating time of the compressor being less than a predetermined time value.

* * * * *